Figure 1:
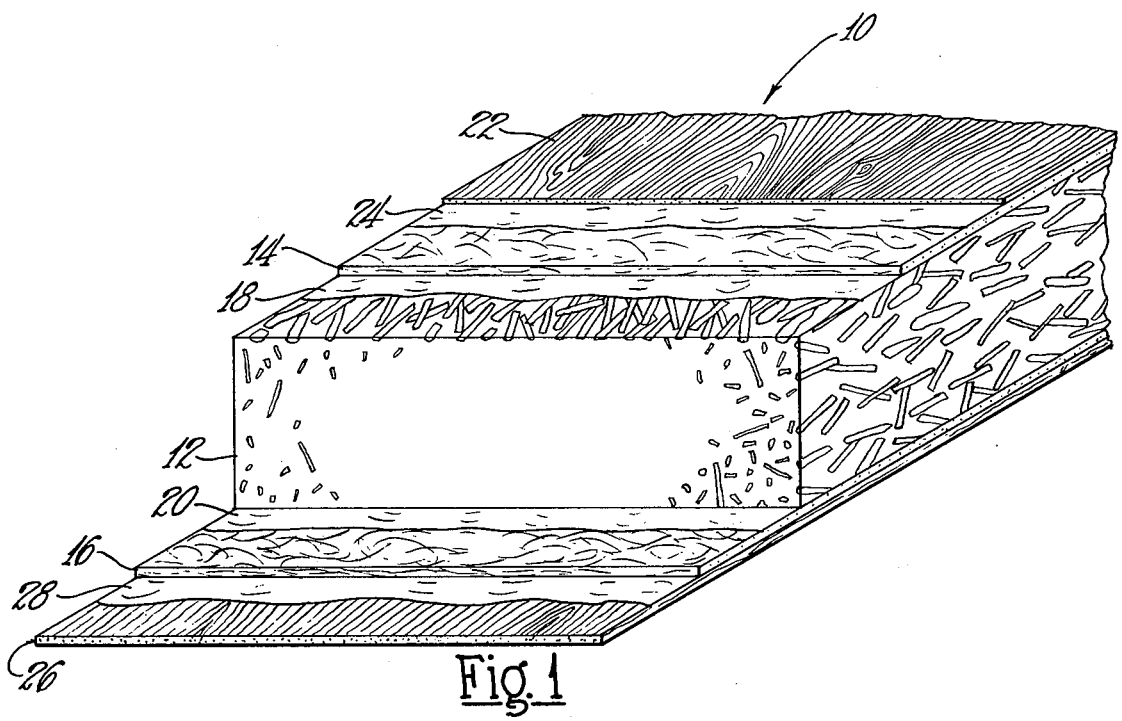

United States Patent [19]
Molloy et al.

[11] 3,916,059
[45] Oct. 28, 1975

[54] LAMINATED PANEL, PARTICULARLY FOR FURNITURE CONSTRUCTION

[76] Inventors: Henry J. Molloy, Lambertville, Mich.; Herman Abber, Brockton, Mass.; Ralph S. Dale, Harmony, R.I.

[22] Filed: Nov. 29, 1973

[21] Appl. No.: 420,032

[52] U.S. Cl. ............... 428/298; 162/145; 162/146; 312/257 SM; 428/302; 428/303; 428/326
[51] Int. Cl.² ................. B32B 21/00; B32B 31/00
[58] Field of Search ........ 161/DIG. 4, 93, 152, 162, 161/168, 156, 37–41; 162/145, 146, 183; 312/257 SM

[56] References Cited
UNITED STATES PATENTS

| | | | |
|---|---|---|---|
| 2,772,603 | 12/1956 | Waggoner | 161/DIG. 4 |
| 2,859,187 | 11/1958 | Ropella | 161/168 X |
| 2,992,152 | 7/1961 | Chapman | 156/280 X |
| 3,563,851 | 2/1971 | Armour et al. | 161/254 X |
| 3,616,112 | 10/1971 | Desai | 161/39 X |
| 3,677,868 | 7/1972 | Boggs | 161/41 X |
| 3,738,900 | 6/1973 | Matzke | 161/37 X |
| 3,749,638 | 7/1973 | Renaud et al. | 162/183 X |
| 3,769,143 | 10/1973 | Kulesza | 161/156 |

Primary Examiner—William J. Van Balen
Assistant Examiner—Henry F. Epstein
Attorney, Agent, or Firm—Carl G. Staelin; John W. Overman; Allen D. Gutchess, Jr.

[57] ABSTRACT

New crossbanding sheets are provided, along with a laminated furniture panel with the new crossbanding sheets. The crossbanding sheets are made of a combination of glass fibers and cellulose fibers held together by a binder extending throughout the sheet. The fibers of the crossbanding sheets may be oriented to some degree, with any orientation being in a direction perpendicular to the direction of orientation of wood chips or grain in a wood core to which the crossbanding sheets are adhered. A decorative surface, preferably a hardwood veneer, is applied to the outer surface of one of the crossbanding sheets with the orientation parallel to that of the core. A backing sheet is adhered to the outer surface of the other of the crossbanding sheets with the orientation thereof parallel to the core. The decorative surface can also be a wood grain design imprinted directly on the outer surface of one of the crossbanding sheets. The crossbanding sheet can also serve as a backing sheet.

5 Claims, 2 Drawing Figures

U.S. Patent    Oct. 28, 1975    3,916,059

LAMINATED PANEL, PARTICULARLY FOR FURNITURE CONSTRUCTION

This invention relates to a cellulose-glasss fiber sheet and more specifically to a method of making a crossbanding material and a laminated panel embodying same.

In laminated panels, such as used in furniture construction, it has long been common to employ core material with a thin laminated facing sheet or veneer of a more expensive material, such as a hardwood. In the usual construction of such a panel, crossbanding sheets are adhered to each side of the core. The facing sheet is then adhered to one of the crossbands and a backing sheet to the other crossband, providing a five layer, substantially-balanced construction. The core has a frequent tendency to warp but the crossbands help to overcome this tendency and maintain the surface of the panel flat. The crossband also provides a smooth, hard mounting surface for the facing sheet to minimize surface telegraphing of the core, which frequently varies widely in density, usually being made of wood scraps or chips, or of lumber. Heretofore, crossbands have commonly been made of thin sheets of poplar. These sheets were placed with the grain perpendicular to the orientation or grain of the core so as to be most effective in preventing warpage. While the poplar has been effective for crossbanding, in recent years the quality thereof has decreased while the cost has increased. Also, for ecological reasons, it is desirable to provide a substitute crossbanding material.

Particularly since the reflective surface of the finished veneer makes unevenness or warpage readily apparent, it is essential that the laminated product have a high degree of smoothness and flatness. Consequently, the crossbanding must be of utmost effectiveness in preventing warping.

Heretofore, attempts to produce substitute crossbanding sheets for the poplar crossbanding sheets have focused on material which is stiff, hard, and strong in an oriented direction, the intent apparently being that the crossbanding sheets will physically resist any tendency of the core to warp. Many of such crossbanding sheets have been less than effective in preventing warping in a substantial number of the panels in which they are used. Other crossbanding sheets have been excessively thick in order to provide the necessary warp resistance, or have been too costly. Still others have lacked internal shear strength so that the veneer or facing sheets could be peeled excessively easily from the panel resulting from internal tearing or shearing of the crossbanding sheets.

The present invention provides an improved crossbanding sheet and a method of making same. The invention is based in part on the discovery that the crossbanding sheet must not only have strength to resist warping but also must be capable of absorbing and releasing moisture. Moisture is present in the core and in particular is present in the adhesive or glue used to bond the crossbanding sheets to the core and to the outer plies. The core absorbs moisture from the glue and expands as it does so. To prevent breaking of the crossband or the bond between the crossbanding sheet and the core, the crossbanding sheet must also be able to absorb and release moisture and to expand at least to some degree, even if not to the extent that the core does. Accordingly, a crossbanding sheet embodying the invention is made of a combination of glass fibers and cellulose fibers. The glass fibers primarily provide strength to resist warping of the core and the cellulose fibers provide the desired degree of water absorption and release to render the crossbanding sheet more compatible with the core. The new crossbanding sheet also provides a certain amount of yield which will accommodate differences in movement of the core and the veneer due to temperature changes and differences in water absorption and release of these two components. Further, the crossbanding sheet is sufficiently dense to prevent the glue layers on each side thereof from penetrating through the sheet to one another. In this manner, two separate glue lines are maintained with the yieldable crossbanding sheet therebetween.

When the five components of the panel, namely the core, two crossbanding sheets, backing sheet, and facing sheet or veneer are assembled, they are placed in a press under heat and/or pressure, depending on the process, for a period of time, the pressure usually being 150 psi or more. Under such pressure, the cellulose fibers act as a cushion and prevent the glass fibers from being crushed. Also, the glass fibers combined with the cellulose fibers provide more uniform strength in all directions.

In accordance with the invention, a resin or binder can be applied to a slurry of the fibers as the crossbanding sheets are being made. This provides an internal bond throughout the thickness of the sheet which cannot be obtained solely by subsequent impregnation. The internal strength thus produced substantially prevents the veneer or backing sheet from being peeled off through internal shearing crossbanding the corssbanding sheet. However, the sheets can also be further impregnated after being made and before being coated with glue and assembled with the other components to produce a panel.

In the method of making the crossbanding sheets, a slurry of glass fibers and water is produced in a tank with an acid such as sulfuric acid added to bring the pH of the slurry to the value of 2.0–2.5. This is necessary to disperse the glass fibers and maintain them in a dispersed condition. A binder such as polyvinyl alcohol in fibrous form is also added to the slurry to provide wet strength. In accordance with the invention, a resin or binder with a catalyst is also added to the slurry to achieve the desired internal bonding in the resulting crossbanding sheet. In a separate tank, cellulose fibers are added to water to form a slurry and are beaten to provide a uniform dispersion of the fibers. The amount of cellulose fibers relative to the glass fibers provides the final desired glass fiber-cellulose fiber ratio in the crossbanding sheet. The two slurries or dispersions are then mixed, placed on a screen, and subjected to a vacuum which removes a substantial portion of the water. The resulting sheet is subsequently heated to remove more of the water. If desired, the dried sheet can be impregnated with an additional amount of the resin or binder by being immersed therein and subsequently squeezed between two control or metering rolls. The impregnated sheet is then cured and cut to size, ready to be asssembled with other components to produce the final panel. The crossbanding sheets are then coated with a glue on each side in a predetermined quantity and assembled with a core. A backing sheet is placed on the outer side of one of the crossbanding sheets and a veneer on the outer side of the other crossbanding sheet. The combination is then placed in a press and cured under pressure for a predetermined time to provide the final product.

The crossbanding sheet according to the invention also can provide a printable surface. As such, the veneer can be eliminated and the surface of the crossbanding sheet printed with a wood grain to achieve a wood appearance. The crossbanding sheet can also be used as a backing sheet in some instances.

It is, therefore, a principal object of the invention to provide a laminated panel having improved crossbanding sheets therein.

Another object of the invention is to provide an improved crossbanding sheet which is more effective in preventing warping in a panel in which it is employed.

A further object of the invention is to provide a crossbanding sheet which is both strong and capable of water absorption and release.

An additional object of the invention is to provide a crossbanding sheet which is more compatible with a core with which it is used.

Still another object of the invention is to provide a crossbanding sheet having greater internal strength to substantially prevent internal shearing.

Still a further object of the invention is to provide a crossbanding sheet comprising glass fibers and cellulose fibers which provides a certain amount of yield between the core and the outer sheet with which it is employed.

Yet another object of the invention is to provide a crossbanding sheet which can be used for a facing sheet or a backing sheet.

Yet a further object of the invention is to provide a method for making a crossbanding sheet.

Figure 2:
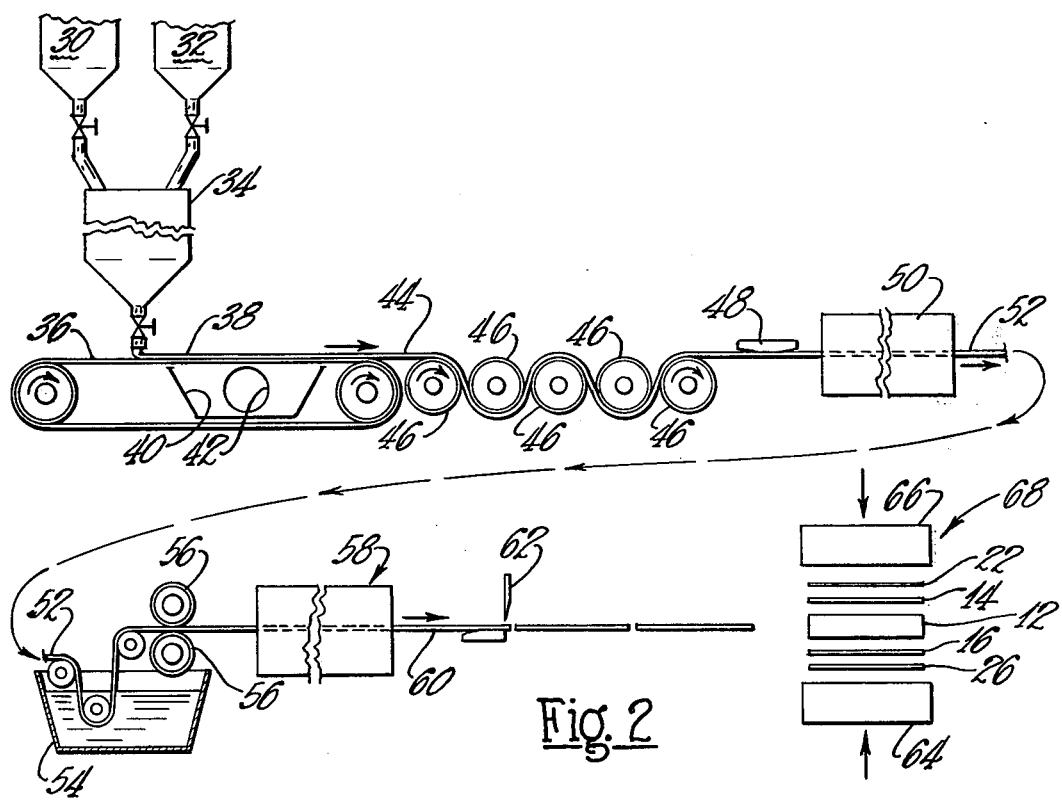

Many other objects and advantages of the invention will be apparent from the following detailed description of preferred embodiments thereof, reference being made to the accompanying drawings, in which:

FIG. 1 is a view in perspective, with portions removed, of a furniture panel constructed according to the invention; and FIG. 2 is a schematic, side view in elevation of apparatus for producing a crossbanding sheet of the panel of FIG. 1.

Referring to FIG. 1, a panel particularly as used in furniture construction is indicated at 10. The panel 10 basically includes a core 12 with crossbanding sheets 14 and 16 adhered to the major surfaces thereof by adhesive or glue layers 18 and 20. A thin veneer or facing sheet 22 is adhered to the outer surface of the crossbanding sheet 14 by an adhesive or glue layer 24 and a backing sheet 26 is adhered to the outer surface of the crossbanding sheet 16 by an adhesive or glue layer 28. The composite is referred to as a balanced system, which is not precisely true because the backing sheet 26 usually is thicker than the veneer or facing sheet 22.

Referring now to the specific components of the laminated panel 10, the core 12 is commonly made of wood lumber, scraps, or chips of various sizes and shapes, with these being held together by a thermosetting resin, a wood chip core being shown. The core has relatively rough surfaces and varies widely in density because of the nature and size of the chips. The core 12 commonly is extruded to an apparent density of 35–50 pounds per cubic foot with the extruding process causing the chips to be oriented, the orientation being transverse to the plane of the drawing sheet, as shown in FIG. 1. The core can also be pressed, usually to an apparent density of 45–55 pounds per cubic foot with the pressed core being substantially less apt to warp than the extruded one. However, the pressed core is also more expensive to produce. The core 12 can also be a lumber core which is made up of strips of random widths of lumber, usually poplar, and suitably adhered to one another along the sides. In either instance, the cores are usually eleven-sixteenths to three-fourths inch thick. The furniture panels sometimes are banded, having peripheral boards of frames of ½ – 1 inch in thickness to provide an appearance of solid wood. Even with the banded panels, however, warping is still usually a problem since seldom are all four edges banded, which is the only condition under which the edge bands help to prevent warpage in both directions.

The glue layers 18 and 20, as well as 24 and 28, can be of, although not limited to, a standard water-based glue commonly used in the furniture industry. By way of example, the glue is applied to the crossbanding sheets 14 and 16 in a total amount of 20–35 pounds per one thousand square feet, with equal amounts being on both sides of the crossbanding sheets. Indications are that less glue can be applied with the crossbanding sheets according to the invention, perhaps in the amount of 20–28 pounds per thousand square feet. In any event, however, a considerable amount of moisture is involved in the laminated panel 10 during production and subsequent thereto.

The veneer can be thin hardwood sliced from a thicker piece thereof with a backing sheet 26 being of poplar or other lower cost material. The veneer 22 will usually be thinner than the backing sheet, e.g. the veneer having a thickness of one-thirty-second inch with the backing sheet 26 having a thickness of one-twenty-eighth inch. The veneer 22 has its grain orientation parallel to that of the wood chips of the core 12, if they are oriented. If the backing sheet 26 has an orientation, it is positioned the same as the veneer 22.

The crossbanding sheets 14 and 16 have the orientation, if any, of the fibers therein perpendicular to that of the core 12 and parallel to the plane of the drawing as shown in FIG. 1. The crossbanding sheets 14 and 16 according to the invention are preferably identical and made by the same process at the same time. The sheets comprise a combination of glass fibers and cellulose fibers, the glass fibers being present in an amount of 5–85 percent, by weight, of the total fibers, with the cellulose fibers present in an amount of 95–15 percent, by weight, of the total fibers. Sheets made with 50–75 percent glass fibers and 50–25 percent cellulose fibers have been found to be particularly satisfactory. A binder extends completely through the sheets 14 and 16 to provide good adherence therein and to overcome any internal shearing tendency. The binder may be more concentrated, however, at the surfaces than in the center, leaving the center with a somewhat resilient or yieldable characteristic. The cellulose fibers used in the sheets 14 and 16 can be of any suitable type employed in a usual paper-making process, preferably being of softwood, such as pine.

The glass fibers have diameters in a range of 0.00020 to 0.00060 inch and preferably in a range of 0.00030 inch to 0.00040 inch. Fibers which are coarser or larger in diameter have a tendency to telegraph or produce a roughness at the outer surface of the veneer 22 while finer fibers tend to be uneconomical for the desired purpose. The glass fibers also are present in lengths from ½ to 1 ½ inches. The longer fibers have more crossover points and, therefore, provide greater strength.

The resin or binder employed is preferably a thermosetting one and is preferably added when the sheets are made so that it will extend throughout the thickness of the sheet, which will range from 15 to 60 mils, depending on need. Additional binder can be impregnated in the sheets after they are formed and initially dried. The additional impregnation of the binder can constitute about 20 to 60 percent of the weight of the final sheets. However, the final surfaces of the crossbanding sheet may have a somewhat textured finish rather than a hard, glossy one, which might occur if the crossbanding sheets weere loaded with resin during the manufacturing process.

The crossbanding sheets 14 and 16 are effective in achieving a non-warping laminated panel. The glass fibers in the crossbanding sheets provide strength which is instrumental in resisting warping of the core 12. The cellulose fibers in the sheets absorb moisture from the glue of the layers 18, 20, 24, and 28 and also release this moisture at a rate comparable to that of the core 12. It has been discovered that the sheets 14 and 16 are particularly effective in preventing warping if their moisture absorption and release characteristics are similar to the corresponding characteristics of popular employed as crossbanding sheets. This renders the crossbanding sheets 14 and 16 more compatible with the core so that as the core tends to swell or expand due to moisture absorption from the glue or ambient air, the crossbanding sheets 14 and 16 will tend to do the same, although perhaps to a lesser extent than the core, so that the crossbanding sheets form a compromise between the movement of the core and the lesser movement of the outer plies 22 and 26 caused by moisture absorption.

The glue layers on the crossbanding sheets 14 and 16 do not penetrate the sheets to the extent of bridging them so that the fibers still exist in the central portions of the sheets, with two separate glue lines or layers thereby being maintained. The binder on the inner fibers provides good resistance against shearing or tearing which could otherwise occur if there were an attempt to peel off the veneer 22 or the backing sheet 26. The cellulose fibers of the sheets provide a degree of cushion or yield to accommodate differences in expansion or contraction of the outer plies and the core and also provide a cushion for the glass fibers which otherwise could be crushed and broken when the panel is placed in a press under pressure to set the glue. The combination of the cellulose fibers and the glass fibers also can be manufactured to provide more uniform strength in all directions. The sheets 14 and 16 still have some tendency to be somewhat oriented, strengthwise, in a direction parallel to the drawing sheet, as shown in FIG. 1. The new crossbanding sheets also provide a substantially greater fire resistance for the panel 10 than do poplar crossbanding sheets.

In making the crossbanding sheets 14 and 16, a slurry of glass fibers and water is prepared in a container 30 of FIG. 2. An acid such as sulfuric acid is added to bring the pH of the slurry down to a low value, in the order of 2.0–2.5 and dispersing agents such as aluminum silicate clay and sodium hexameta phosphate are also added. These are important in order to disperse the fibers and maintain them in a dispersed condition. A bonding agent such as polyvinyl alcohol in fibrous form is also added to the slurry. These fibers subsequently dissolve in the presence of heat and water, when the material is subsequently heated to drive out the water, thereby providing wet strength to hold the cellulose and glass fibers together initially.

In accordance with the invention, a binder for the crossbanding sheets 14 and 16 is also added to the container 30. This binder provides internal strength against shearing, as has been common in many artificial crossbanding sheets. Further, the internal strength is greater than that which could be achieved by only impregnating the sheet after it is completed and dried. This binder can be a thermosetting polymer with a pH below 7.0, being sufficiently low that the binder will not precipitate out of the slurry. Preferably the binder is an aqueous emulsion of a vinyl acetate copolymer as described in U.S. Pat. No. 3,563,851. This patent also describes metallic salt curing agents suitable as catalysts for the vinyl acetate copolymer.

Another thermosetting resin binder which can be employed is a Cashew shell derivative resin to which is added urea formaldehyde and epoxy. This is particularly effective when used with a phenolic resin as an adhesive in place of the glue, as will be subsequently discussed, although no additional adhesive or glue at all may be needed.

By way of further example, the glass fibers are present in the water in an amount of one-half of 1 percent by weight, with the polyvinyl alcohol fibers being about 5 percent of the weight of the glass fibers. The catalyst in the dispersion or slurry is present, by way of example, in an amount of 3 percent, by weight of the vinyl acetate copolymer binder. The binder can be added in an amount of 500 pounds per 12,000 gallons of water and is recycled, with the amount of this binder applied to the fibers being about one-half of 1 percent by weight of the fibers.

The cellulose fibers are added to water in a second tank 32 and beaten with considerable agitation to provide the proper dispersion. The amount of the cellulose fibers depends on the ratio of cellulose fibers to the glass fibers desired in the final crossbanding sheet.

Before the two dispersions or slurries are combined, the pH of the glass fiber slurry can be raised up to 3–6.5 by adding sodium hydroxide or ammonium hydroxide, for example. This reduces corrosion of the equipment and degradation of the cellulose fibers as disclosed more fully in a co-pending U.S. patent application of Renaud et al, Ser. No. 105,713 now U.S. Pat. No. 3,749,638. The slurries are then combined in a container 34 and are deposited on a screen belt 36, with the speed of the belt 36 determining the thickness of the layer and the thickness of the final sheet. Suction is applied to a layer 38 of the combined fibers on the belt 36 to remove a substantial portion of the water therein. A vacuum chamber 40 to which an exhuast blower (not shown) is connected by an exhaust duct 42 is located below the upper run of the screen belt 36 for this purpose. A sheet or web 44, which constitutes the layer 36 with a substantial portion of the water removed, has sufficient integrity to hold together as it is discharged off the screen belt 36. The web 44 then is led around a plurality of heated rolls 46 to drive off more of the water and is then directed under a guide 48 and through an oven 50 in which the remainder of the water is removed.

A resulting dried sheet or web 52 can then be further impregnated with more of the same thermosetting binder applied in the container 30. A 20 to 50 percent solution of this binder is located in a vat 54 in which the web 52 is immersed, with the web then passing between squeeze or metering rolls 56 to assure that a predetermined amount of the binder is applied to the web, this binder being present in the final sheet typically in an amount of 20–60 percent, by weight, of the sheet.

The additional impregnation of resin in the sheet is not necessary if a sufficient amount is added when the layer is first formed. However, the double addition of the binder provides some binder throughout the thickness of the crossbanding sheets with the binder being concentrated at the surfaces. With or without the additional binder, the binder in the interior of the sheet holds the fibers together to provide shear strength. The web is then passed through a curing oven 58 to provide a final crossbanding web 60 which is cut by a knife 62 to produce the sheets 14 and 16 of predetermined size.

The resulting crossbanding sheets 14 and 16 are then coated with adhesive or glue in the amount discussed above and placed between platens 64 and 66 of a press 68 along with the core 12, the veneer 22 and the backing sheet 26. The platens are then brought together to cure or harden the glue and provide the final product. By way of example, the platens can be heated to a temperture of 250°F. and a pressure of 150 psi is applied on the laminates for a period of 1 ½ to 5 minutes. The press 68 can be of three types. One is a shsuttle press in which the lower platen is movable, two being employed with one being loaded while the other is in the press. A second type of press, known as a Fritz press, employs a larger amount of catalyst in the glue to hasten the curing process. In a third type of press, the glue employed is more slower drying with no heat being applied but with 15–20 of the laminated panels 10 being stacked together and left for several days.

Rather than employing the glue as commonly used in such panels, the crossbanding sheets can have a top coating of a phenolic resin on both sides which is only cured to the B stage. When placed in the press, the resin becomes thermoplastic when heated and then becomes thermoset to provide the desired adhesion between the crossbanding sheets and the contiguous components of the panel. With the Cashew shell derivative resin, no additional adhesive at all may be required.

By way of the further illustration, a specific mode of practicing the invention is set forth. To make the crossbanding sheet, sulphuric acid was added to 12,000 gallons of water in the container 30 to bring the pH down to 2.2. Five hundred pounds of the thermosetting binder were also added to the water along with the catalyst in an amount of 3 percent by weight of the binder. Glass fibers having a diameter in a range from 0.0030–0.00040 inch and with a length of about three-fourths inch were added to the water in an amount of 500 pounds and polyvinyl alcohol fibers were added in an amount of 5 percent, by weight, of the glass fibers. The dispersing agents were also added in an amount of 150 pounds of aluminum silicate clay and 75 pounds of sodium hexameta phosphate. The pH of the slurry was then raised to about 4.5 by the addition of sodium hydroxide. In the second tank 32, cellulose fibers made from pine pulp were added to 12,000 gallons of water in an amount of one-half of 1 percent, by weight, of the water with the resulting slurry beaten to provide dispersion of the fibers. The slurries were then combined in the container 34 and deposited on the screen belt 36 moving at a speed such that the resulting layer provided a final sheet having a thickness of 40 mils. Water was extracted from the layer in the vacuum chamber 40 with the resulting layer further heated on the rolls 46 at 300°F. and in the oven 50 at 320°F. A 25 percent solution of the binder with 3 percent catalyst was also supplied in the vat 54 with the dry sheet 52 then immersed therein and subsequently squeezed between the rolls 56 to cause the binder in the final sheet to be present in an amount of 50 percent, by weight, of the sheet. The sheet was then cured in the oven 58 at a temperature of 320°F. for a period of 2½ minutes to provide the final web 60 which was cut to shape by the knife 62.

The resulting crossbanding sheets were then assembled with the wood chip core 12 which was extruded, having an apparent density of 40 pounds per cubic foot and a thickness of eleven-sixteenth inch. The veener 22 was one-thirtysecond inch thick and made of thin hardwood while the backing sheet 26 was one-twentyeighth inch thick and made of poplar. The grain orientation of both the veneer and the backing sheet were parallel and were also parallel to the orientation of the wood chips in the core 12. The crossbanding sheets were adhered to the core and to the veneer and the backing sheet with the standard glue used in the furnature industry spread in an amount of 35 pounds per 1,000 square feet. The assembly was then placed in a press, the platens of which were heated to a temperature of 250°F. and a pressure of 150 psi was applied for 4 minutes to produce the final composite.

Various modifications of the above-described embodiments of the invention will be apparent to those skilled in the art, and it is to be understood that such modifications can be made without departing from the scope of the invention, if they are within the spirit and the tenor of the accompanying claims.

We claim:

1. In combination, a wood core having the wood in a particular orientation with the core tending to warp about axes parallel to the direction of orientation, said core being capable of absorbing and releasing moisture, a crossbanding sheet affixed to each side of said core by a layer of adhesive with any orientation thereof disposed generally perpendicular to that of the core, a facing sheet affixed to one side of one of said crossbanding sheets by a layer of adhesive, and a backing sheet affixed to one side of the other one of said crossbanding sheets by a layer of adhesive, each of said crossbanding sheets comprising a substantially uniform distribution or intermingled glass and cellulose fibers, with the glass fibers present in an amount of 5–85 percent, by weight, and the cellulose fibers present in an amount of 95–15 percent, by weight, a binder throughout each of said crossbanding sheets and holding the fibers thereof together to provide internal shear strength for said crossbanding sheets, and additional binder on each of the surfaces of each of said crossbanding sheets, the binder maintaining the adjacent adhesive layers on said crossbanding sheets separate to provide two separate glue lines for each of said crossbanding sheets, said binder being originally a thermosetting polymer with a pH below 7.0 prior to being thermally set.

2. The combination according to claim 1 characterized by the glass fibers being present in an amount of 50–75 percent, by weight, and the cellulose fibers being present in an amount of 50–25 percent, by weight, in said crossbanding sheets.

3. The combination according to claim 1 characterized by said binder being originally an aqueous emulsion of a vinyl acetate copolymer.

4. The combination according to claim 1 characterized by each of said crossbanding sheets having a thickness of 15–60 mils, and said binder being present in an amount of about 20–60 percent of the weight of the sheets.

5. A laminated furniture panel comprising a wood core, said core having two major generally parallel surfaces, a crossbanding sheet on each side of said core and adhered thereto by a layer of adhesive, each of said crossbanding sheets being of uniformly distributed, intermingled glass and cellulose fibers, said glass fibers being present in an amount of 5–85 percent, by weight, said glass fibers having diameters in the range of 0.00020 to 0.00060 inch and lengths from ½ to 1½ inches, and said cellulose fibers being present in an amount of 95–15 percent, by weight, a binder extending throughout each of said crossbanding sheets, said binder being originally in aqueous emulsion of a vinyl acetate copolymer with a pH below 7.0 prior to being thermally set, said binder being present in an amount of about 20–60 percent of the weight of the crossbanding sheets, the binder in each of the crossbanding sheets being more concentrated at the surface portions thereof than at the center portions, a wood veneer affixed to the outer surface of one of said crossbanding sheets by a layer of adhesive, a backing sheet affixed to the outer surface of the other one of said crossbanding sheets by a layer of adhesive, said backing sheet being thicker than said veneer, the orientation of said veneer and said backing sheet being parallel to one another, the fibers of said crossbanding sheets being oriented in a direction perpendicular to the orientation of said veneer and said backing sheet, said crossbanding sheets having a thickness of 15 to 60 mils, and said core having a thickness of eleven-sixteenth to three-fourth inch.

* * * * *